(12) United States Patent
Schaeuble

(10) Patent No.: US 10,315,626 B2
(45) Date of Patent: Jun. 11, 2019

(54) CLEANING ARRANGEMENT FOR A WIPER ARM OF A WINDSCREEN WIPER SYSTEM, WIPER ARM AND WINDSCREEN WIPER SYSTEM

(71) Applicant: Valeo Systèmes d'Essuyage, Le Mesnil Saint Denis (FR)

(72) Inventor: Michael Schaeuble, Vaihingen/Enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 8 days.

(21) Appl. No.: 15/203,867

(22) Filed: Jul. 7, 2016

(65) Prior Publication Data
US 2017/0008493 A1    Jan. 12, 2017

(30) Foreign Application Priority Data
Jul. 7, 2015   (DE) .................. 10 2015 110 987

(51) Int. Cl.
| | | |
|---|---|---|
| *B60S 1/34* | (2006.01) | |
| *B60S 1/52* | (2006.01) | |
| *B60S 1/40* | (2006.01) | |

(52) U.S. Cl.
CPC .......... *B60S 1/3415* (2013.01); *B60S 1/4038* (2013.01); *B60S 1/522* (2013.01); *B60S 1/524* (2013.01)

(58) Field of Classification Search
CPC ............................. B60S 1/3415; B60S 1/522
USPC .................................................. 15/250.04
See application file for complete search history.

(56) References Cited

U.S. PATENT DOCUMENTS

| | | | |
|---|---|---|---|
| 3,432,876 A | 3/1969 | Edwards | |
| 2007/0226983 A1* | 10/2007 | Reynolds | B29C 45/1704 29/447 |
| 2014/0115807 A1* | 5/2014 | Bousset | B60S 1/524 15/250.04 |

FOREIGN PATENT DOCUMENTS

| | | | |
|---|---|---|---|
| DE | 102004007351 A1 | 9/2005 | |
| EP | 3002166 A1 | 4/2016 | |
| FR | 2902063 A1 * | 12/2007 | ............ B60S 1/3415 |

OTHER PUBLICATIONS

FR2902063A1 (machine translation), 2007.*
Search Report Issued in Corresponding German Application No. 10 2015 110 987.5, dated May 9, 2016 (7 Pages).

* cited by examiner

*Primary Examiner* — Andrew A Horton
(74) *Attorney, Agent, or Firm* — Osha Liang LLP

(57) ABSTRACT

The invention relates to a cleaning arrangement (10; 10a) for a wiper arm (1) of a windscreen wiper system (100), wherein the cleaning arrangement (10; 10a) has at least one spray nozzle (21, 22) for a cleaning fluid, wherein the cleaning arrangement (10; 10a) is constructed to form en engagement connection (30) at the wiper arm (1), and wherein the engagement connection (30) comprises at the cleaning arrangement (10; 10a) at least one resiliently constructed engagement element (40; 40a) which is constructed to cooperate with an engagement mount (54; 54a) at the wiper arm (1). There is provision according to the invention for the cleaning arrangement (10; 10a) to have first guide means (35), which first guide means (35) are constructed to be able to rotate the cleaning arrangement (10; 10a) in a rotation axis (37) in order to establish the engagement connection (30).

7 Claims, 3 Drawing Sheets

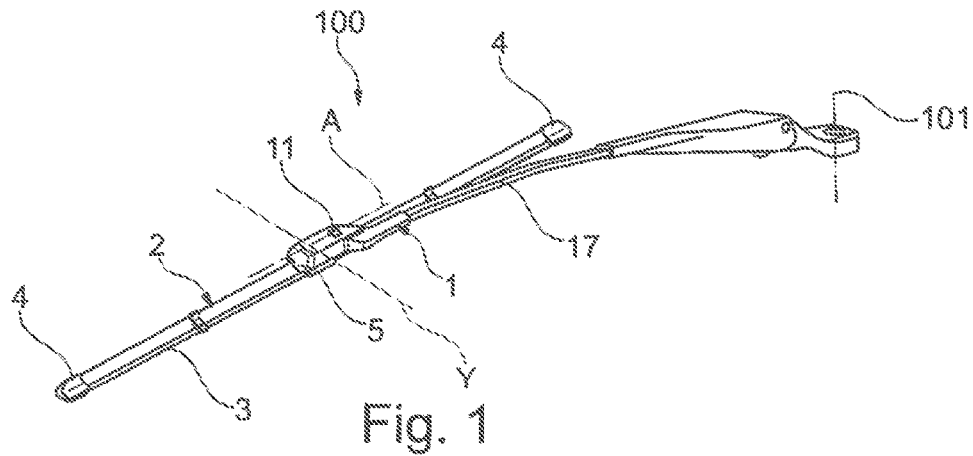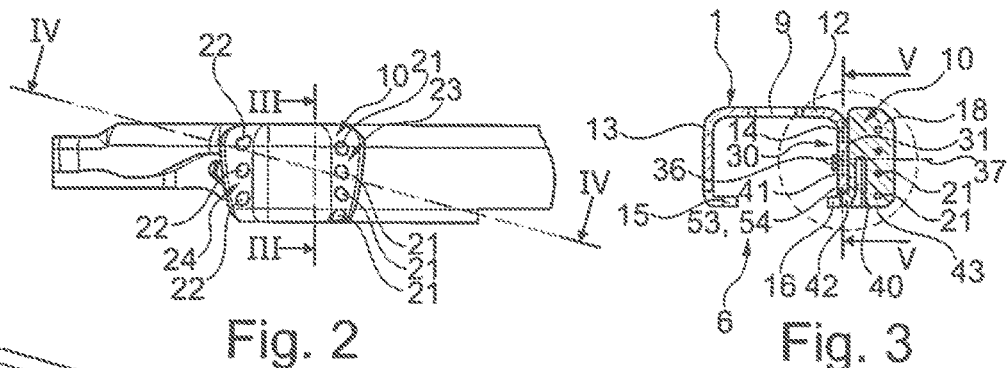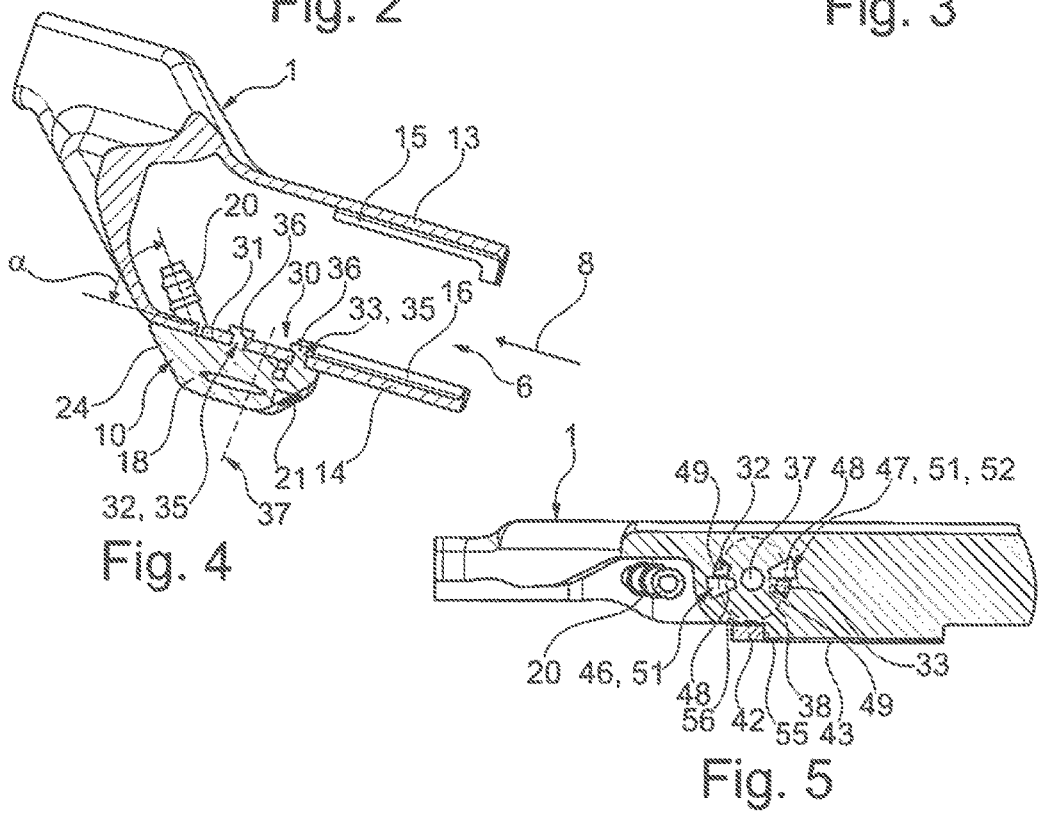

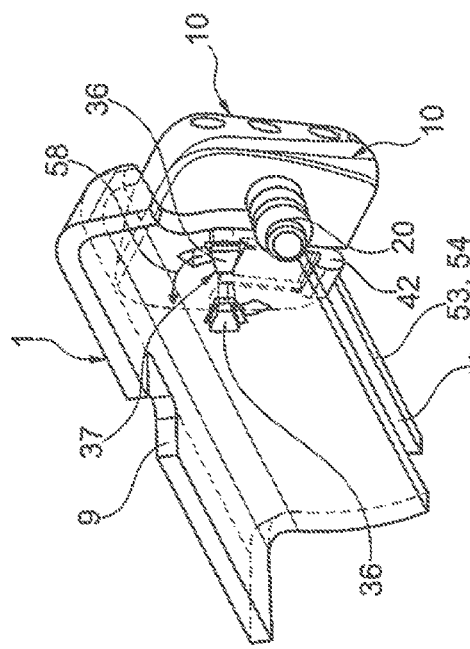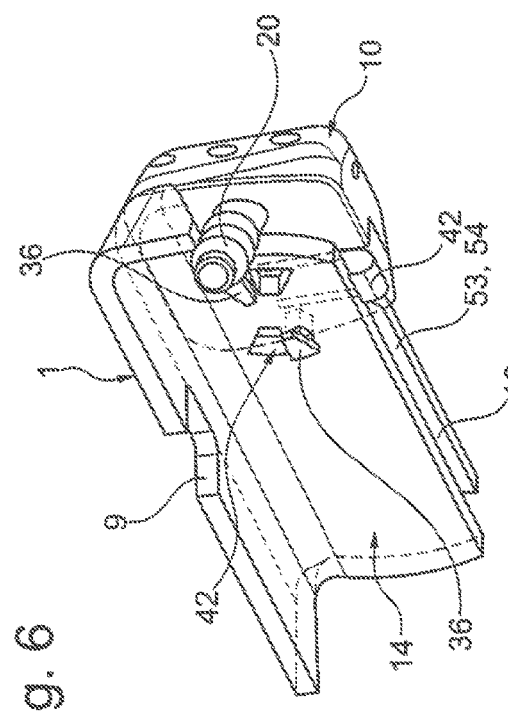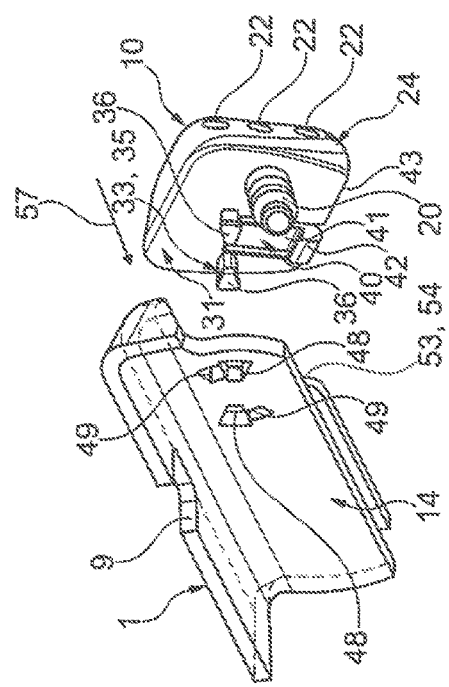

CLEANING ARRANGEMENT FOR A WIPER ARM OF A WINDSCREEN WIPER SYSTEM, WIPER ARM AND WINDSCREEN WIPER SYSTEM

PRIOR ART

The invention relates to a cleaning arrangement for a wiper arm of a windscreen wiper system according to the preamble of claim 1. The invention further relates to a wiper arm for a cleaning arrangement according to the invention and a windscreen wiper system having a cleaning arrangement and a wiper arm.

A cleaning arrangement according to the preamble of claim 1 is known from the subsequently published EP14306557.1 of the same Applicant. The known cleaning arrangement is connected to the outer side of a wiper arm via an engagement connection which has a clip-fit element on the cleaning arrangement. To this end, the wiper arm has in the side wall a recess, in which the cleaning arrangement engages with the clip-fit element. However, details regarding the engagement connection or the clip-fit element cannot be taken from the application mentioned.

Furthermore, DE 10 2004 007 351 A1 discloses the integration of a cleaning arrangement having a spray nozzle inside the cross-section of the wiper arm, wherein the wiper arm is constructed so as to be increased in the width thereof in the region of the cleaning arrangement. The arrangement or assembly of such a cleaning arrangement is relatively difficult in practice. In particular, a separate replacement of such a cleaning arrangement for repair or maintenance purposes can be carried out by a user only with great difficulty in practice.

Therefore, it is desirable to have a cleaning arrangement which can be assembled and disassembled on/from a wiper arm in a particularly simple manner and which allows secure fixing to the wiper arm. In particular, the release of the cleaning arrangement from the wiper arm as a result of a release force which acts in a single direction, as produced, for example, by washing brushes in a vehicle cleaning installation, is also intended to be reliably avoided.

STATEMENT OF INVENTION

On the basis of the prior art set out, an object of the invention is to develop a cleaning arrangement for a wiper arm of a windscreen wiper system according to the preamble of claim 1 so that, on the one hand, it can be fixed and released to/from the wiper arm as simply, quickly and reliably as possible and, on the other hand, the (unintentional) release of the cleaning arrangement from the wiper arm as a result of forces acting on the cleaning arrangement is prevented.

This object is achieved according to the invention with a cleaning arrangement for a wiper arm of a windscreen wiper system having the characterising features of claim 1. The cleaning arrangement comprises first guide means which are constructed to be able to rotate the cleaning arrangement in a rotation axis to establish the engagement connection which can be formed between the cleaning arrangement and the wiper arm. In other words, this means that the fixing of the cleaning arrangement and consequently also where applicable release of the cleaning arrangement from a wiper arm is/are brought about by a rotational movement. Such a rotational movement, in which a torque which acts in the direction of the rotation axis mentioned has to be applied to the cleaning arrangement for assembly and disassembly, is a particularly reliable fixing of the cleaning arrangement to the wiper arm.

Advantageous developments of the cleaning arrangement according to the invention are set out in the dependent claims. The scope of the invention includes all combinations of at least two features which are disclosed in the claims, description and/or Figures.

In a preferred structural embodiment of the guide means or the engagement element, there is provision for the (first) guide means to be constructed as at least one element separate from the at least one engagement element. It is thereby possible to optimise both the engagement element and the first guide means with regard to the functionality thereof.

In a development of the last proposal mentioned, there is provision for the first guide means to have at least one, preferably several extensions which are constructed to be inserted within a mount opening of the wiper arm. Such extensions may be produced in a particularly simple manner on the cleaning arrangement in that they are conventionally formed as injection-moulded plastics components so that the (integral) forming of extensions maybe readily integrated in the design of the cleaning arrangement or the production process of the cleaning arrangement.

A structural embodiment is particularly preferred using at least two extensions which are arranged on a common circle diameter around the rotation axis at preferably equal angular distances from each other.

In order to secure or fix the at least one extension to the wiper arm with respect to a direction which extends in the direction of the rotation axis, there is provision for the at least one extension to have a head portion with an increased cross-section, which head portion is constructed to engage behind a wall section of the wiper arm.

The invention also comprises a wiper arm for a cleaning arrangement according to the invention described above, wherein the wiper arm has a mount region for the fastening of a wiper blade by means of a fastening arrangement of the wiper blade, wherein the wiper arm is constructed to establish an engagement connection with the cleaning arrangement according to the invention, and wherein the engagement connection has at least one engagement mount at the wiper arm, which is constructed to cooperate with at least one resilient engagement element, for example a clip-fit element at the cleaning arrangement. There is provision according to the invention for second guide means to be provided at the wiper arm, which second guide means are constructed to be able to rotate the cleaning arrangement in a rotation axis to establish the engagement connection relative to the wiper arm.

Similarly to the first guide means or the at least one engagement element with respect to the cleaning arrangement, there is similarly preferably provision on the wiper arm for the second guide means to be constructed as separate elements from the at least one engagement mount. Consequently, both the second guide means and the engagement mount may also be optimised with regard to the functionality thereof.

In a structurally preferred embodiment of the second guide means, the guide means have at least one mount opening which is constructed to cooperate with an extension of the cleaning arrangement. In this instance, such a mount opening is preferably in the form of a guide path in the shape of a circular arc segment.

Finally, the invention also comprises a windscreen wiper system, with a cleaning arrangement according to the invention and a wiper arm described above, wherein the engagement connection fixes the cleaning arrangement on the wiper arm in a direction extending in the rotation axis.

In order to allow assembly and disassembly of the cleaning arrangement on the wiper arm which are as simple as possible, there is particularly preferably provision for the cleaning arrangement to be arranged on an outer side of the wiper arm.

In order to further allow an extent in a longitudinal direction of the wiper blade which is as great as possible for the cleaning fluid which is discharged from the cleaning arrangement, there is further provision for the cleaning arrangement to be arranged in the region of the mount region for the wiper blade. That mount region is generally arranged in the wiper blade centre when viewed towards the axial extent of the wiper blade so that, as a result of a corresponding arrangement or configuration of spray nozzles, a uniform application to a vehicle windscreen is possible over the longitudinal extent of the wiper blade.

Additional advantages, features and details of the invention will be appreciated from the following description of preferred embodiments and with reference to the drawings below.

BRIEF DESCRIPTION OF DRAWINGS

FIG. 1 is a perspective view of a windscreen wiper system,

FIG. 2 is a side view of the wiper arm of the windscreen wiper system according to FIG. 1 in the region of the cleaning arrangement, FIG. 3 is a cross-section through the wiper arm in the plane III-III of FIG. 2, FIG. 4 is a longitudinal section through the wiper arm of FIG. 2 in the plane IV-IV of FIG. 2, FIG. 5 is a section in the plane V-V of FIG. 3, FIGS. 6 to FIG. 8 are partially sectioned, perspective views of the assembly process of a first cleaning arrangement according to the invention in the region of the wiper arm and

DETAILED DESCRIPTION

Figure 9:
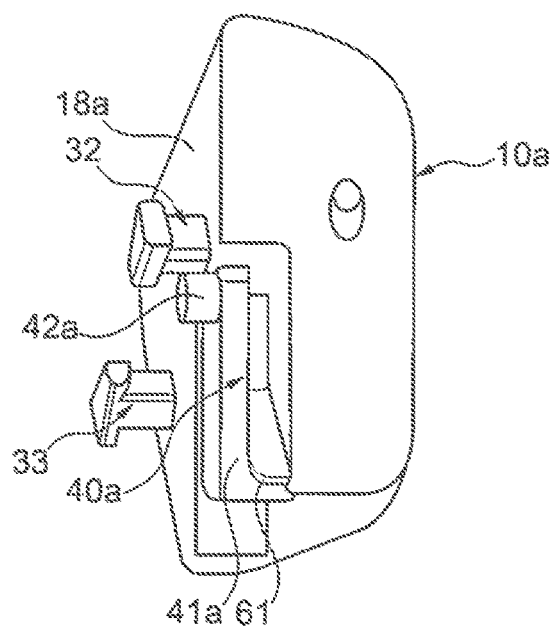
FIG. 9.

Elements which are the same or which have the same function are indicated in the Figures with the same reference numerals.

FIG. 1 shows a windscreen wiper system 100 for cleaning a vehicle windscreen which is not shown. The windscreen wiper system 100 has a wiper arm 1 which is arranged in a pivotable manner about an axis 101 and the end region of which facing away from the axis 101 is connected to a wiper blade 2 which is known per se. The wiper blade 2 has in particular a rubber wiper member 3 with a wiper lip which adjoins the vehicle windscreen. At the upper side facing away from the vehicle windscreen, the wipe blade 2 has, for example, a spoiler-like portion or cross-section.

The wiper blade 2 extends along a longitudinal axis A and is arranged for movement about a pivot axis Y on the wiper arm 1 in order to be able to adapt in an optimum manner in particular to the curvature of the vehicle windscreen during movement along the vehicle windscreen. The front-side end regions of the wiper blade 2 are connected to an end piece 4.

In order to fix the wiper blade 2 to the wiper arm 1 in a replaceable manner, the wiper blade 2 has a wiper blade adapter 5 which is known per se and by means of which the wiper blade 2 can be introduced into a substantially U-shaped mount region 6 of the wiper arm 1 from the direction of the arrow 8 and can be withdrawn from the mount region 6 counter to the direction of the arrow 8 (FIG. 4). In order to secure or fix the wiper blade 2 in the mount region 6, the wiper arm 1 has at an upper side thereof a recess 9 which is, for example, rectangular in cross-section and in which an engagement element which is arranged on the wiper blade 5 and which is in the form of a push-button 11 projects in order to form an engagement connection between the wiper blade 2 and the wiper arm 1 (see FIG. 1).

As can best be seen with reference to FIG. 3, the mount region 6 of the wiper arm 1 has two side was 13, 14 which project from the upper side 12 of the wiper arm 1 and which are arranged parallel with each other. Retention portions 15, 16 project inwards from the side walls 13, 14 at the side facing away from the upper side 12. The wiper blade 2 is received inside the mount region 6 constructed in this manner with the wiper blade adapter 5 in a fixed manner.

A cleaning arrangement 10 according to the invention is arranged at one side wall 14 of the wiper arm 1 which is arranged at the side facing away from a wiper rod 17 of the wiper arm 1.

The cleaning arrangement 10 at least substantially comprises plastics material and is constructed as an injection-moulded plastics component. The cleaning arrangement 10 has a substantially block-like or parallelepipedal member 18, from which a supply connecting piece 20 projects, over which the end of a hose line which is not shown may be fitted in order to supply the cleaning arrangement 10 with cleaning fluid.

The hose line mentioned is in this instance guided in particular inside the cross-section of the wiper arm 1, wherein in accordance with the illustration of FIG. 4 the supply connecting piece 20 is arranged inside the mount region 6 with the cleaning arrangement 10 mounted on the wiper arm 1 and extends at an angle a relative to the side wall 14.

A plurality of spray nozzles having spray openings 21, 22 are arranged or formed on the outer face of the member 12 and are supplied with the cleaning fluid via the supply connecting piece 20, Whereas, by way of example, four spray openings 21 which are arranged one above the other are formed on an obliquely arranged, front end face 23 of the member 18 in accordance with the illustration of FIG. 3, three spray openings 22 which are arranged one above the other are provided on a rear, similarly obliquely arranged end face 24. The spray streams of the cleaning agent or the spray openings 21, 22 are orientated relative to the wiper blade 2 so that cleaning fluid strikes the vehicle windscreen 1 in particular in the longitudinal direction or in the direction of the longitudinal axis A in front of the wiper blade 2, wherein the cleaning fluid is distributed as uniformly as possible over the longitudinal region of the wiper blade 2 or the vehicle windscreen as a result of corresponding angles of the spray nozzles 21, 22.

The connection between the cleaning arrangement 10 or the member 18 and the wiper arm 1 is brought about by means of an engagement connection 30, The engagement connection 30 comprises, at a side face 31 of the member 18 facing the side wall 14 of the wiper blade 2, two extensions 32, 33 which project from the side face 31 at right angles and which together form first guiding means 35 for the cleaning arrangement 10. As can best be seen with reference to FIGS. 4 and 6 to 8, the extensions 32, 33 have at the side facing away from the side face 31 a head portion 36 which is increased in cross-section and which is formed to fix or secure, when the cleaning arrangement 10 is mounted on the wiper arm 1, the cleaning arrangement 10 to the wiper arm 1 in a direction extending in the direction of an axis 37 (FIGS. 4 and 5). This is brought about in that the head portions 36 of the extensions 32, 33 engage behind the side wall 14 of the wiper arm 1 or adjoin the inner side of the side wall 14 in a positive-locking manner, The axis 37 extends perpendicularly to the side wall 14 of the wiper arm 1 and the side face 31 of the cleaning arrangement 10.

The extensions 32, 33 are arranged on a circle diameter 38 around the axis 37, preferably at identical angular spacings relative to each other. In the embodiment illustrated, the two extensions 32, 33 are consequently arranged to be offset relative to each other by 180° (FIG. 5).

Furthermore, a resilient engagement element 40 is integrally formed on the member 18 of the cleaning arrangement 10. The engagement element 40 has, as can best be seen with reference to FIGS. 3 and 6, an engagement tongue 41, on an end region of which an engagement projection 42 is formed. The engagement tongue 41 extends substantially perpendicularly to a underside 43 of the member 18 and the engagement projection 42 projects beyond the side face 31 of the member 18, similarly to the extensions 32, 33, and terminates substantially flush with the underside 43.

The side wall 14 of the wiper arm 1 has for each of the two extensions 32, 33 in accordance with the illustration of FIGS. 5 and 6 a mount opening 46, 47 in the form of an aperture (FIG. 5). The two mount openings 46, 47 are also arranged or formed so as to be offset through 180° relative to each other in the region of the circle diameter 38. Each of the two mount openings 46, 47 has a mount portion 48 which is formed so as to be increased in cross-section and which a guide portion 49 adjoins. While the cross-section of the mount portion 48 is at least as large as the cross-section of the head portion 36 of the extensions 32, 33, that is to say, is suitable for guiding the head portion 36 through the assembly portion 48, the cross-section of the guide portion 49 is adapted to the cross-section of the extensions 32, 33 in the region of an intermediate portion 50 of the extensions 32, 33 which connects the extensions 32, 33 to the side face 31 of the member 18.

The assembly portions 48 form together with the guide portions 49 a circular-arc-segment-like guide path 51 for the extensions 32, 33, Furthermore, the mount openings 46, 47 form second guide means 52 which form the engagement connection 30 together with the first guide means 35 or the extensions 32, 33.

Furthermore, the wiper arm 1 has in the region of the first retention portion 16 a recess 53 which acts as an engagement mount 54 for the engagement projection 42 of the engagement element 40 of the cleaning arrangement 10. As can best be seen with reference to FIG. 5, the recess 53 has a front stop edge 55 and an upper stop edge 56 which act as a stop during engagement of the engagement projection 42 or which prevent additional movement of the engagement projection 42 or the cleaning arrangement 10.

The above explanations show that in the cleaning arrangement 10 the elements for forming the engagement connection 30 comprise, on the one hand, the two extensions 32, 33 which form the first guide means 53 and, on the other hand, the engagement element 40. In particular, the first guide means 35 and the engagement element 40 are constructed as mutually separate elements. Similarly, the second guide means 52 and the engagement mount 54 are also constructed as mutually separate elements or recesses on the wiper arm 1.

The assembly of the cleaning arrangement 10 on the wiper arm 1 is explained below with reference to FIGS. 6 to 8 as follows. First, the cleaning arrangement 10 is orientated in accordance with FIG. 6 relative to the wiper arm 1 so that the extensions 32, 33 are aligned with the assembly portions 48 of the mount opening 46, 47. Subsequently, the cleaning arrangement 10 is moved in accordance with the direction of the arrow 57 against the side wall 14 of the wiper arm 1. In this instance, the extensions 32, 33 extend through the assembly portions 48 of the mount openings 46, 47 until the side face 31 of the member 18 of the cleaning arrangement 10 abuts the side wall 14 of the wiper arm 1, That state is illustrated in FIG. 7. Subsequently, the cleaning arrangement 10 is rotated about the axis 37 in accordance with the direction of the arrow 58. In this instance, the head portions 36 of the extensions 32, 33 move into operative connection with the inner side of the side wall 14 and therefore prevent the cleaning arrangement 10 from being able to be moved away from the wiper arm 1 (counter to the direction of the arrow 57). At the same time, the initially resiliently depressed engagement projection 42 of the engagement element 40 moves into the region of the recess 53 on the wiper arm 1 during additional rotation of the cleaning arrangement 10 about the axis 37. As soon as the cleaning arrangement 10 has reached its desired position or desired angular position on the wiper arm 1, which is ensured by a corresponding length of the guide paths 49, the engagement projection 42 of the engagement element 40 also engages with the engagement mount 54 on the wiper arm 1. Additional movement of the cleaning arrangement 10 on the wiper arm 1 in both rotation directions is an thereby prevented. That installation state is illustrated in FIG. 8.

In order to release the engagement connection 30 or to disassemble the cleaning arrangement 10, it is necessary to press in the engagement dement 40 in the region of the engagement projection 42 in the direction towards the member 18, which may be achieved by a corresponding recess 59 on the member 18, in which the engagement element 40 is arranged.

Figure 10:
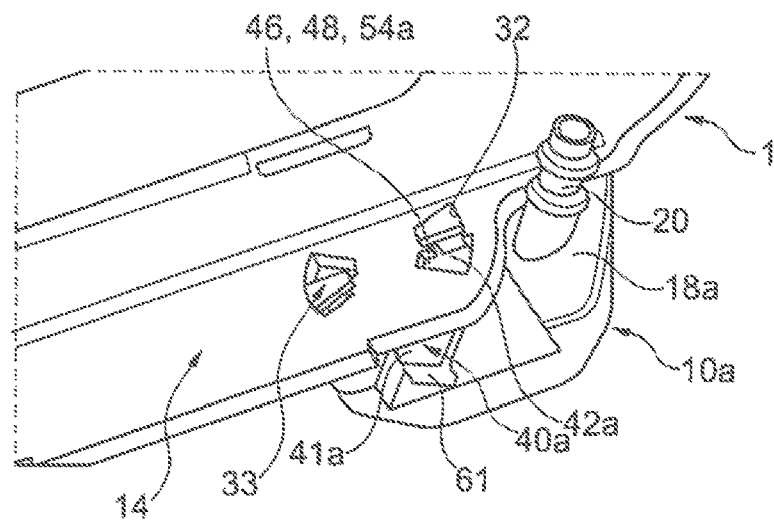
FIG. 10 are also partially sectioned, perspective views of a cleaning arrangement which is mounted on a wiper arm and which is constructed in an alternative manner with respect to FIGS. 6 to 8.

FIGS. 9 and 10 illustrate a modified cleaning arrangement 10a. The cleaning arrangement 10a differs from the cleaning arrangement 10 in that the engagement element 40a is connected to an engagement tongue 41a via a connection portion 61 which is arranged in the region of the underside 43 of the member 18a. The engagement projection 42a arranged on the engagement tongue 41a terminates in a substantially central region of the member 18a near one extension 32. In particular, the engagement projection 42a has a cross-section surface-area which corresponds to the cross-section surface-area of the mount opening 46 in the region of the mount portion 48.

The cleaning arrangement 10a is assembled on the wiper arm 1 in a manner similar to the cleaning arrangement 10. Unlike that arrangement, however, the engagement projection 42a is arranged in the region of the assembly portion 48 of the mount opening 46 in the end position of the cleaning arrangement 10a as can be seen in FIG. 10, that is to say that the assembly portion 48 forms the engagement mount 54a. Consequently, it is possible to dispense with a separate engagement mount 54 which is formed on the wiper arm 1.

The windscreen wiper system 100 or the cleaning arrangement 10, 10a and the wiper arm 1 described above may be changed or modified in many manners without departing from the notion of the invention.

LIST OF REFERENCE NUMERALS

1 Wiper arm
2 Wiper blade
3 Rubber wiper member
4 End piece
5 Wiper blade adapter
6 Mount region
8 Arrow
9 Recess
10, 10a Cleaning arrangement
11 Push-button
12 Upper side
13 Side wall
14 Side wall
15 Retention portion
16 Retention portion
27 Wiper rod
18, 18a Member
20 Supply connecting piece
21 Spray opening
22 Spray opening
23 End face
24 End face
30 Engagement connection
31 Side face
32 Extension
33 Extension
35 Guide means
36 Head portion
37 Axis
38 Circle diameter
40, 40a Engagement element
41, 41e Engagement tongue, side face
42, 42a Engagement projection
43 Underside
46 Mount opening
47 Mount opening
48 Assembly portion
49 Guide portion
50 intermediate portion
51 Guide path
52 Guide means
53 Recess
54, 54a Engagement mount
55 Stop edge
56 Stop edge
57 Arrow
58 Arrow
59 Recess
61 Connection portion
100 Windscreen wiper system
101 Axis
A Longitudinal axis
Y Pivot axis
α Angle

What is claimed is:

1. A cleaning arrangement for a wiper arm of a windscreen wiper system, comprising:
a plurality of spray nozzles for a cleaning fluid, the plurality of spray nozzles having spray openings formed on an obliquely arranged surface of the cleaning arrangement; and
a supply connecting piece extending into the wiper arm to supply the cleaning arrangement with the cleaning fluid,
wherein the cleaning arrangement is constructed to form an engagement connection at the wiper arm, and
wherein at the cleaning arrangement, the engagement connection comprises at least one resilient engagement element which is constructed to cooperate with an engagement mount at the wiper arm,
wherein a first guide means is constructed to establish the engagement connection by rotating the cleaning arrangement with respect to a rotation axis, and
wherein the obliquely arranged surface of the cleaning arrangement is obliquely arranged from a wall of the cleaning arrangement on which the first guide means is arranged.

2. The cleaning arrangement according to claim 1, wherein the first guide means is constructed as at least one separate element from the at least one engagement element.

3. The cleaning arrangement according to claim 2, wherein the first guide means comprises at least one extension to be insertable into a mount opening of the wiper arm.

4. The cleaning arrangement according to claim 3, wherein at least two extensions are provided which are arranged on a common circle diameter around the rotation axis at equal angular distances relative to each other.

5. The cleaning arrangement according to claim 3, wherein the at least one extension comprises a head portion with an increased cross-section, which head portion is constructed to engage behind a wall of the wiper arm.

6. The cleaning arrangement according to claim 1, wherein the cleaning arrangement is constructed as an injection moulded part comprising a plastics material, and the engagement element is formed as an engagement projection in one piece on the cleaning arrangement.

7. A cleaning arrangement for a wiper arm of a windscreen wiper system, comprising:
a plurality of spray nozzles for a cleaning fluid, the plurality of spray nozzles having spray openings formed on an obliquely arranged surface of the cleaning arrangement,
wherein the cleaning arrangement is constructed to form an engagement connection at the wiper arm, and
wherein at the cleaning arrangement, the engagement connection comprises at least one resilient engagement projection element which is constructed to cooperate with a recess acting as an engagement mount at the wiper arm;
wherein a first guide means is constructed to establish the engagement connection by rotating the cleaning arrangement with respect to a rotation axis, wherein the obliquely arranged surface of the cleaning arrangement is obliquely arranged from a wall of the cleaning arrangement on which the first guide means is arranged; and
wherein the engagement projection is constructed to move into the recess during rotation of the cleaning arrangement with respect to said rotation axis.

* * * * *